US012630373B2

(12) United States Patent (10) Patent No.: US 12,630,373 B2
Suto et al. (45) Date of Patent: May 19, 2026

(54) TRANSFER ROBOT TEACHING SYSTEM AND TRANSFER ROBOT TEACHING METHOD

(71) Applicant: DAIHEN Corporation, Osaka (JP)

(72) Inventors: Yoshihiro Suto, Osaka (JP); Jun Iura, Osaka (JP)

(73) Assignee: DAIHEN Corporation, Osaka (JP)

( * ) Notice: Subject to any disclaimer, the term of this patent is extended or adjusted under 35 U.S.C. 154(b) by 66 days.

(21) Appl. No.: 18/893,165

(22) Filed: Sep. 23, 2024

(65) Prior Publication Data

US 2025/0108981 A1 Apr. 3, 2025

(30) Foreign Application Priority Data

Sep. 29, 2023 (JP) ................................. 2023-170242

(51) Int. Cl.
B25J 9/00 (2006.01)
B25J 9/16 (2006.01)
B65G 47/90 (2006.01)

(52) U.S. Cl.
CPC ............ B65G 47/905 (2013.01); B25J 9/163 (2013.01)

(58) Field of Classification Search
CPC ....... B65G 47/905; B25J 9/163; B25J 9/1664; B25J 9/04; B25J 13/08; B25J 15/0014; B25J 19/02
See application file for complete search history.

(56) References Cited

U.S. PATENT DOCUMENTS

2025/0108981 A1* 4/2025 Suto ..................... B65G 47/905

FOREIGN PATENT DOCUMENTS

JP 2015153809 8/2015

* cited by examiner

*Primary Examiner* — Ian Jen
(74) *Attorney, Agent, or Firm* — HSML P.C.

(57) ABSTRACT
A teaching system is provided for a transfer robot including a vertical arm assembly, a rotation member, a horizontal arm assembly supported by the rotation member, a hand section supported by the horizontal arm assembly and provided with a detection sensor, and a control device configured to teach a position of the hand section using the sensing results of the target by the detection sensor. The target has first and second edges horizontally spaced apart from each other by distance L1. The control device adjusts the angel around a central axis and x, y positions of the hand section based on the distance L1 and a rotation angle through which the hand section is rotated around the central axis until the first or second edge is detected.

6 Claims, 11 Drawing Sheets

(a)

(b)

(c)

(d)

(e)

(a)

(b)

(c)

(d)

(a)

(b)

(c)

TRANSFER ROBOT TEACHING SYSTEM AND TRANSFER ROBOT TEACHING METHOD

FIELD

The present disclosure relates to a transfer robot teaching system and a transfer robot teaching method.

BACKGROUND

In the manufacture of semiconductor substrates and liquid crystal substrates, a plurality of substrates are stored in a multi-level storage container called a cassette. The cassette is transferred to processing devices and inspection devices where the substrates are processed and inspected. At the processing and inspection devices, the substrates are loaded and unloaded to and from the cassette by transfer robots, which are industrial robots. To enable a transfer robot to perform the loading and unloading tasks, a human operator needs to perform teaching work, which involves teaching the robot the necessary movements and actions in advance.

The teaching work is extremely time-consuming. The slots in a cassette for storing substrates are very narrow and have little clearance. For a cassette that is open only on one side, the interior of the cassette may not be visible except from the open side. In addition, a transfer robot is usually located in front of the open side, making it difficult for the operator to see the interior of the cassette. The teaching work requires the operator to manually operate the transfer robot to place substrates in and out of the narrow slots, relying on their own eye and intuition.

JP-A-2015-153809 discloses a configuration for teaching work. According to this document, an object detection sensor is attached to a hand of a robotic arm and used to detect a protrusion provided on a jig. The teaching work is performed using the results of detection. This configuration eliminates the need for manual operations by an operator in teaching work and thus reduces the time required for teaching work. For some transfer robots, however, the configuration disclosed in the document may not enable efficient teaching work.

SUMMARY

The present disclosure has been made in light of the circumstances described above, and its main objective is to provide a teaching system for a transfer robot that is suitable for efficient teaching work.

To solve the above issues, the present disclosure provides the following technical solutions.

According to a first aspect of the present disclosure, a teaching system is provided for a transfer robot. The applicable transfer robot may be provided with: a vertical arm assembly that is of a vertical articulated type and moves in an in-plane direction orthogonal to a horizontal first direction; a first rotation member supported by the vertical arm assembly and rotatable around a first rotation axis that extends in the first direction; a horizontal arm assembly that is of a horizontal articulated type and is supported by the first rotation member; a hand section supported by the horizontal arm assembly and provided with an object detection sensor; and a control device that detects a detection target with the object detection sensor while moving the hand section and teaches a position of the hand section using a result of the detection. The detection target includes a first edge and a second edge that is spaced apart from the first edge by a first distance, where the first edge is located on a first side in a horizontal second direction orthogonal to the first direction and on a first side in a third direction orthogonal to the first direction and the second direction, and the second edge is located on a second side in the second direction and on the first side in the third direction. The teaching system comprises causing the control device to adjust an angle of the hand section around a central axis that extends in the first direction, a position of the hand section in the second direction, and a position of the hand section in the third direction, where the adjustment is based on at least the first distance and a rotation angle through which the hand section is rotated around the central axis until at least one of the first edge and the second edge is detected.

In a preferred embodiment, the control device is configured to: move the hand section toward a second side in the third direction until the first edge is detected and record a position to which the hand section is moved as a first position; rotate the hand section around the central axis from the first position until the second edge is detected and record a first rotation angle through which the hand section is rotated; move the hand section from the first position toward the second side in the second direction by a second distance; rotate the hand section around the central axis until the second edge is detected and record a second rotation angle through which the hand section is rotated; and adjust the angle of the hand section around the central axis, the position of the hand section in the second direction, and the position of the hand section in the third direction, using the first distance, the second distance, the first rotation angle, and the second rotation angle.

In a preferred embodiment, the control device is configured to: move the hand section toward the second side in the third direction until the first edge is detected; move the hand section toward the first side in the third direction by a third distance and record a position to which the hand section is moved as a second position; rotate the hand section around the central axis from the second position until the first edge is detected and record a third rotation angle through which the hand section is rotated; rotated the hand section around the central axis from the second position until the second edge is detected and record a fourth rotation angle through which the hand section is rotated; and adjust the angle of the hand section around the central axis, the position of the hand section in the second direction, and the position of the hand section in the third direction, using the first distance, the third distance, the third rotation angle, and the fourth rotation angle.

In a preferred embodiment, the detection target has a shape of a rectangular parallelepiped.

According to a second aspect of the present disclosure, there is provided a teaching method for a transfer robot. The applicable transfer robot may be provided with: a vertical arm assembly that is of a vertical articulated type and moves in an in-plane direction orthogonal to a horizontal first direction; a first rotation member supported by the vertical arm assembly and rotatable around a first rotation axis that extends in the first direction; a horizontal arm assembly that is of a horizontal articulated type and is supported by the first rotation member; and a hand section supported by the horizontal arm assembly and provided with an object detection sensor. The teaching method is configured to detect a detection target with the object detection sensor while moving the hand section and teach a position of the hand section using a result of the detection. The detection target includes a first edge and a second edge that is spaced apart from the first edge by a first distance, where the first edge is located on a first side in a horizontal second direction orthogonal to the first direction and a first side in a third direction orthogonal to the first direction and the second direction, and the second edge is located on a second side in the second direction and the first side in the third direction. The teaching method comprises: moving the hand section toward a second side in the third direction until the first edge is detected and recording a position to which the hand section is moved as a first position; rotating the hand section around a central axis that extends in the first direction, from the first position until the second edge is detected and recording a first rotation angle through which the hand section is rotated; moving the hand section from the first position toward the second side in the second direction by a second distance; rotating the hand section around the central axis until the second edge is detected and recording a second rotation angle through which the hand section is rotated; and adjusting an angle of the hand section around the central axis, a position of the hand section in the second direction, and a position of the hand section in the third direction, using the first distance, the second distance, the first rotation angle, and the second rotation angle.

According to a third aspect of the present disclosure, there is provided a teaching method for a transfer robot. The transfer robot may be provided with: a vertical arm assembly that is of a vertical articulated type and moves in an in-plane direction orthogonal to a horizontal first direction; a first rotation member supported by the vertical arm assembly and rotatable around a first rotation axis that extends in the first direction; a horizontal arm assembly that is of a horizontal articulated type and is supported by the first rotation member; and a hand section supported by the horizontal arm assembly and provided with an object detection sensor. The teaching method is configured to detect a detection target with the object detection sensor while moving the hand section and teach a position of the hand section using a result of the detection. The detection target includes a first edge and a second edge that is spaced apart from the first edge by a first distance, where the first edge is located on a first side in a horizontal second direction orthogonal to the first direction and a first side in a third direction orthogonal to the first direction and the second direction, and the second edge is located on a second side in the second direction and the first side in the third direction. The teaching method comprises: moving the hand section toward a second side in the third direction until the first edge is detected; moving the hand section toward the first side in the third direction by a third distance and recording a position to which the hand section is moved as a second position; rotating the hand section around a central axis that extends in the first direction, from the second position until the first edge is detected and recording a third rotation angle through which the hand section is rotated; rotating the hand section around the central axis from the second position until the second edge is detected and recording a fourth rotation angle through which the hand section is rotated; and adjusting an angle of the hand section around the central axis, a position of the hand section in the second direction, and a position of the hand section in the third direction, using the first distance, the third distance, the third rotation angle, and the fourth rotation angle.

The teaching system for a transfer robot according to the present disclosure, which may be suitable for use with a transfer robot provided with a vertical arm assembly, a first rotation member and a horizontal arm assembly, enables efficient adjustment of the position of the hand section in the second direction and the third direction within a plane defined by the second direction and the third direction, as well as efficient adjustment of the angle in the direction of rotation around the axis extending in the first direction.

Other features and advantages of the present disclosure will be more apparent from the detailed description given below with reference to the attached drawings.

DRAWINGS

EMBODIMENTS

The following describes preferred embodiments of the present disclosure with reference to the drawings.

In the present disclosure, the terms such as "first", "second", and so on are used only as labels and not imply an order of the items referred to by the terms.

Figure 1:
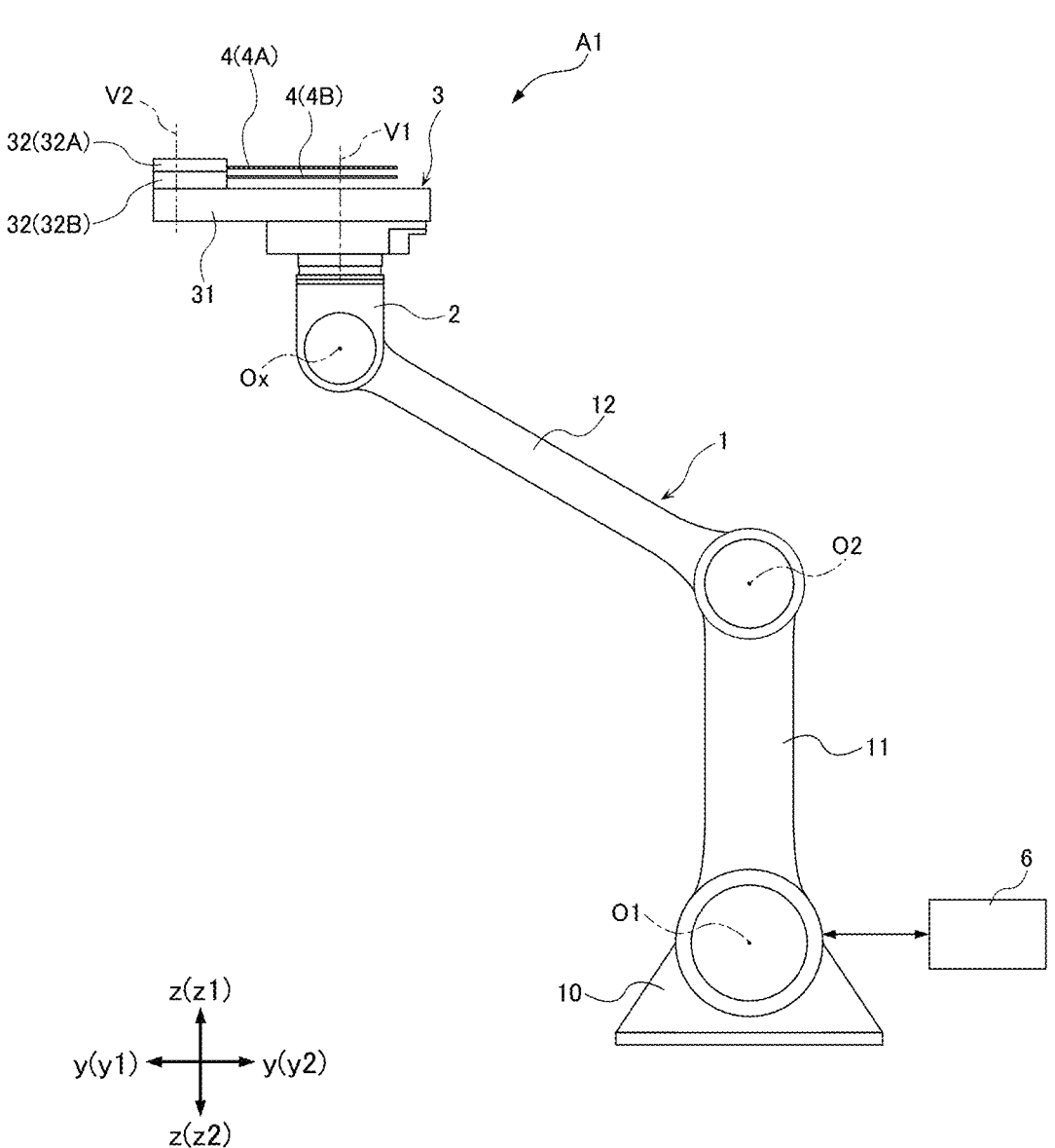
FIG. 1 is a schematic front view of an example of a transfer robot included in a transfer robot teaching system according to the present disclosure.
Figure 2:
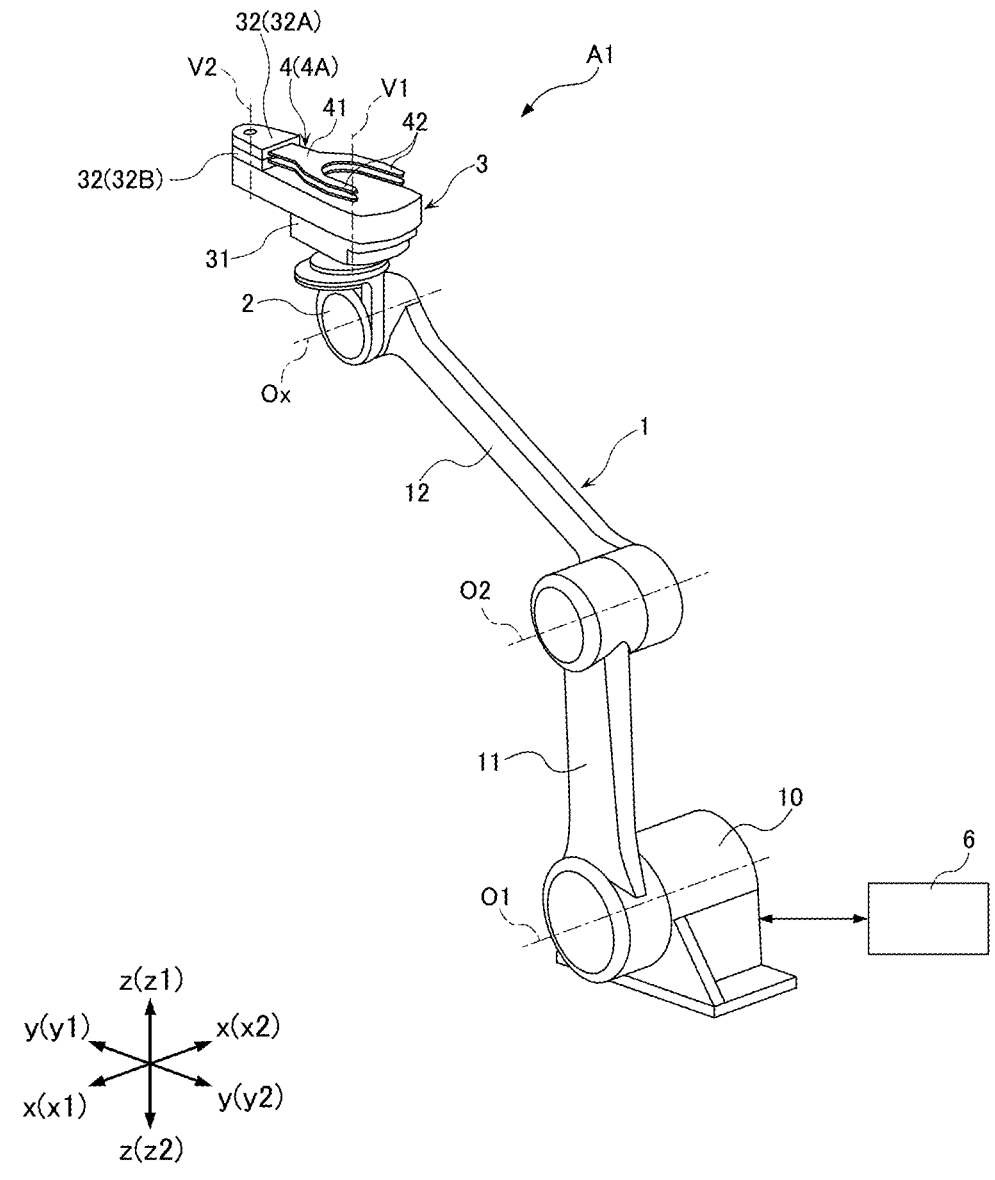
FIG. 2 is a perspective view of the transfer robot shown in FIG. 1.

FIG. 1 is a schematic front view showing an example of a transfer robot included in a transfer robot teaching system according to the present disclosure. The transfer robot A1 shown in FIG. 1 handles tasks, including retrieving substrates stored in a multi-level storage cassette 8 (see FIG. 3), which is located on a load port, and transferring the substrates to a load lock chamber located opposite the cassette 8, as well as retrieving substrates having been processed in a processing chamber through the load lock chamber and transferring the substrates back into the cassette 8.

The transfer robot A1 includes a vertical arm assembly 1, a first rotation member 2, a horizontal arm assembly 3, a hand section 4, a control device 6, a drive mechanism 71, and an input unit 72.

In the illustrated example of the present embodiment, the x direction corresponds to the "first direction" of the present disclosure, and the y direction corresponds to the "second direction" of the present disclosure. The x and y directions are orthogonal to each other, and both are parallel to the horizontal plane. The z direction is orthogonal to the x and y directions and corresponds to the vertical direction when the transfer robot A1 is installed in a transfer chamber (not shown), for example. The z direction also corresponds to the "third direction" of the present disclosure. In the following description, the upper side in the z direction may be referred to as the "z1 side in the z direction", and the lower side may be referred to as the "z2 side in the z direction". The z1 side in the z direction corresponds to the "first side in the third direction" of the present disclosure, and the z2 side in the z direction corresponds to the "second side in the third direction". In addition, one side in the x direction may be referred to as the "x1 side in the x direction", and the other side as the "x2 side in the x direction". One side in the y direction is referred to as the "y1 side in the y direction", and the other side as the "y2 side in the y direction". The y1 side in the y direction corresponds to the "first side in the second direction" of the present disclosure, the y2 side in the y direction corresponds to the "second side in the second direction".

The vertical arm assembly 1 is of a vertical articulated type and moves in an in-plane direction that is orthogonal to the horizontal x direction. The vertical arm assembly 1 may be composed of a plurality of arms joined to allow rotational motion. In the illustrated example, the vertical arm assembly 1 includes a first vertical arm 11 and a second vertical arm 12. The first vertical arm 11 extends within a plane defined by the y and z directions and is supported by a fixed base 10. Specifically, the first vertical arm 11 has its proximal end supported by the fixed base 10 to be rotatable around a first horizontal axis O1 that extends in the x direction. The second vertical arm 12 extends within a plane defined by the y and z directions and is supported by the first vertical arm 11. Specifically, the second vertical arm 12 has its proximal end supported by the distal end of the first vertical arm 11 to be rotatable around a second horizontal axis O2 that extends in the x direction. The configuration of the vertical arm assembly 1 is not limited to the illustrated example.

The first rotation member 2 is supported by the second vertical arm 12 (the vertical arm assembly 1). Specifically, the first rotation member 2 is supported by the distal end of the second vertical arm 12 to be rotatable around a first rotation axis Ox that extends in the x direction.

Although not shown or described in detail, the first vertical arm 11 and the second vertical arm 12 may be driven by a motor through a power transmission means (a drive mechanism), such as belts and reduction gears, to rotate around the first horizontal axis O1 and the second horizontal axis O2. By controlling the motor, the horizontal arm assembly 3 supported by the vertical arm assembly 1 via the first rotation member 2 can be moved to a desired position, such as to the front of the cassette or the load lock chamber. The first rotation member 2 is driven to rotate around the first rotation axis Ox by a drive mechanism not shown in the figures. The first rotation member 2 can thus keep the horizontal arm assembly 3 (a first horizontal arm 31 and a second horizontal arm 32 described later) in a horizontal position.

The horizontal arm assembly 3, which is supported by the first rotation member 2, is of a horizontal articulated type and moves within a horizontal plane orthogonal to the z direction (the vertical direction). The horizontal arm assembly 3 may be composed of a plurality of arms joined to allow rotational motion. In the illustrated example, the horizontal arm assembly 3 includes a first horizontal arm 31 and a second horizontal arm 32. The first horizontal arm 31 has its proximal end supported by the first rotation member 2 to be rotatable around a first vertical axis V1 that extends in the z direction. The second horizontal arm 32 has its proximal end supported by the distal end of the first horizontal arm 31 to be rotatable around a second vertical axis V2 that extends in the z direction. In the present embodiment, the second horizontal arm 32 includes two second horizontal arms 32A and 32B that are stacked one atop the other. The configuration of the horizontal arm assembly 3 is not limited to the illustrated example.

Although not shown or described in detail, the first horizontal arm 31 and the second horizontal arm 32 may be driven by a motor through a power transmission means (a drive mechanism), such as belts and reduction gears, to rotate around the first vertical axis V1 and the second vertical axis V2. By controlling the motor, a later described hand section 4 (hand sections 4A and 4B) supported by the second horizontal arm 32 (the second horizontal arms 32A and 32B) can be moved linearly in the horizontal x direction.

The hand section 4 is supported by the second horizontal arm 32 (the horizontal arm assembly 3). Specifically, the hand section 4 is joined to the second horizontal arm 32. In the present embodiment, the hand section 4 includes two hand sections 4A and 4B that are stacked one atop the other. The hand sections 4A and 4B are respectively attached to the second horizontal arms 32A and 32B.

The hand section 4 (each of the hand sections 4A and 4B) is a substantially U-Shaped plate having a base end 41 connected to the second horizontal arm 32 (each of the second horizontal arms 32A and 32B) and two long and narrow holding sections 42 extending from the base end 41. The hand section 4 can hold a thin substrate (not shown). The configuration of the hand section 4 is not limited to the illustrated example.

With a substrate placed on the hand section 4 that is held horizontal, the transfer robot A1 causes the hand section 4 to move up and down and rotate or translate within an xy plane. Through these motions, the transfer robot A1 stores a substrate into a slot 81 of the cassette 8 (loading of a substrate into the cassette 8) and receives a substrate stored in a slot 81 with the hand section 4 to remove the substrate from the cassette 8 (unloading of a substrate from the cassette 8).

The hand section 4 is provided with an object detection sensor 5 attached to the end of each holding section 42. Details of the object detection sensor 5 will be described later.

The cassette 8 has is a box with a rectangular parallelepiped shape. The cassette 8 is open at least on the side facing the transfer robot A1 to allow loading and unloading of substrates. The cassette 8 has a plurality of projections on the opposite inner surfaces, forming a plurality of slots 81 for multi-level storage of a plurality of substrates. A substrate is held in a pair of slots 81 provided at the same height by being supported on the upper surfaces of a pair of projections at the same height. Each pair of opposing slots 81 in the cassette 8 is separated by a gap that is longer than the length of the hand section 4 in the lateral direction (the width of the hand section 4). This allows the hand section 4 to move up and down within the cassette 8 without interfering with the slots 81.

Figure 4:
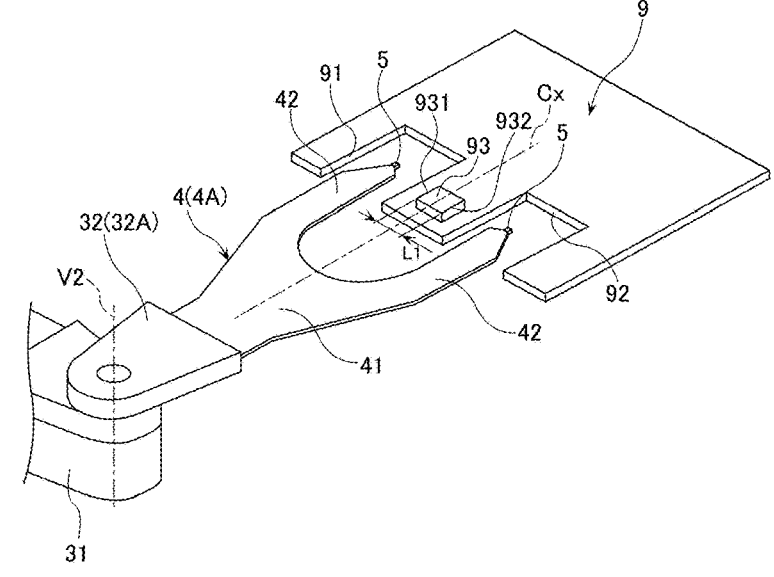
FIG. 4 is a perspective view showing the relative positions of a detection target and a hand section.
Figure 4:
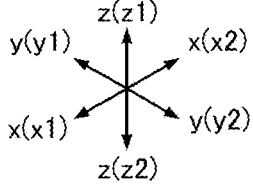

The object detection sensor 5 may be a fiber sensor, which is a type of an optical sensor, for example. A fiber sensor includes a light emitter and a light detector and detects the presence of an object between them based on whether the detector receives light from the emitter. The object detection sensor 5 is not limited to a fiber sensor and may be other sensors capable of detecting the presence of an object. The following description assumes that the object detection sensor 5 is a fiber sensor. As shown in FIG. 4, the light emitter of the object detection sensor 5 is attached to the tip of one holding section 42 of the hand section 4, and the light detector of the object detection sensor 5 is attached to the tip of the other holding section 42.

The object detection sensor 5 is provided for detecting a slot 81 in the cassette 8 that stores a substrate. Specifically, the transfer robot A1 moves the hand section 4 up and down (in the z direction in FIG. 4) while the light emitter of the object detection sensor 5 emits light toward the light detector. The hand section 4 is moved so that the edge of a substrate blocks the optical axis of the object detection sensor 5, while ensuring that the hand section 4 does not touch the substrate. When a substrate is not placed in a slot 81, the light detector receives light from the light emitter. When a substrate is a placed in a slot 81, light from the light emitter is blocked by the substrate, and the light detector does not receive light. Thus, whether each slot 81 stores a substrate is determined based on the results of detection by the object detection sensor 5.

Figure 5:
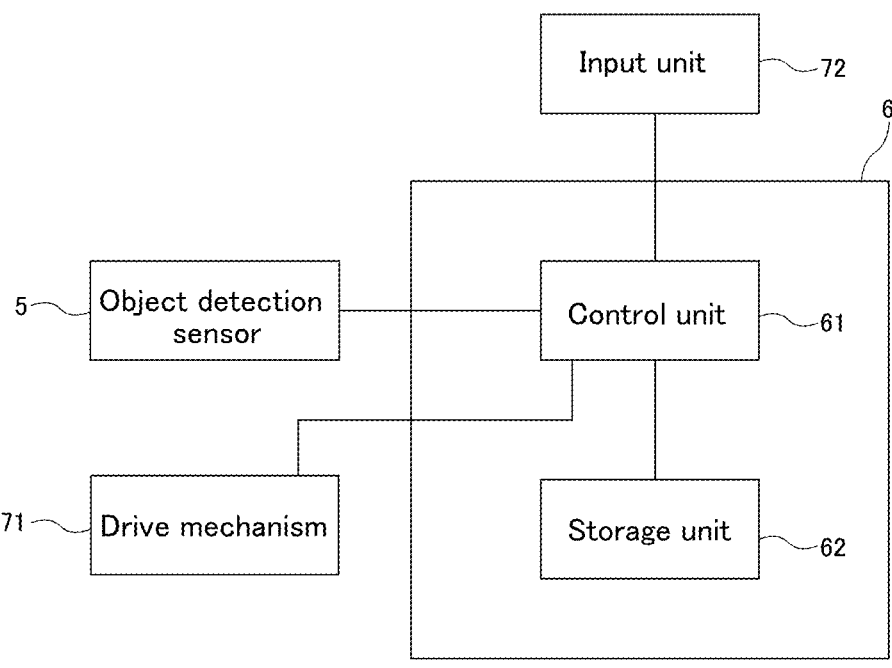
FIG. 5 is a block diagram showing the control of the transfer robot.

The control device 6 controls the movements of the vertical arm assembly 1, the first rotation member 2, and the horizontal arm assembly 3 and teaches the position of the hand section 4. As shown in FIG. 5, the control device 6 includes a control unit 61 and a storage unit 62. The control unit 61 controls the drive mechanism 71 based on teaching information stored in the storage unit 62. The drive mechanism 71 accordingly drives the vertical arm assembly 1, the first rotation member 2, and the horizontal arm assembly 3 to perform predetermined movements. The control unit 61 also controls the drive mechanism 71 based on information inputted at the input unit 72. The input unit 72 is a device (e.g., a teach pendant) used by an operator for teaching work or manual operations. The control unit 61 performs a teaching process described later, thereby assisting teaching work and automatically perform teaching work. The teaching process will be described later. The storage unit 62 stores teaching information that describe the trajectory of the movement of the hand section 4. The information obtained through the teaching process in advance is recorded in the storage unit 62 and used as the teaching information.

Figure 3:
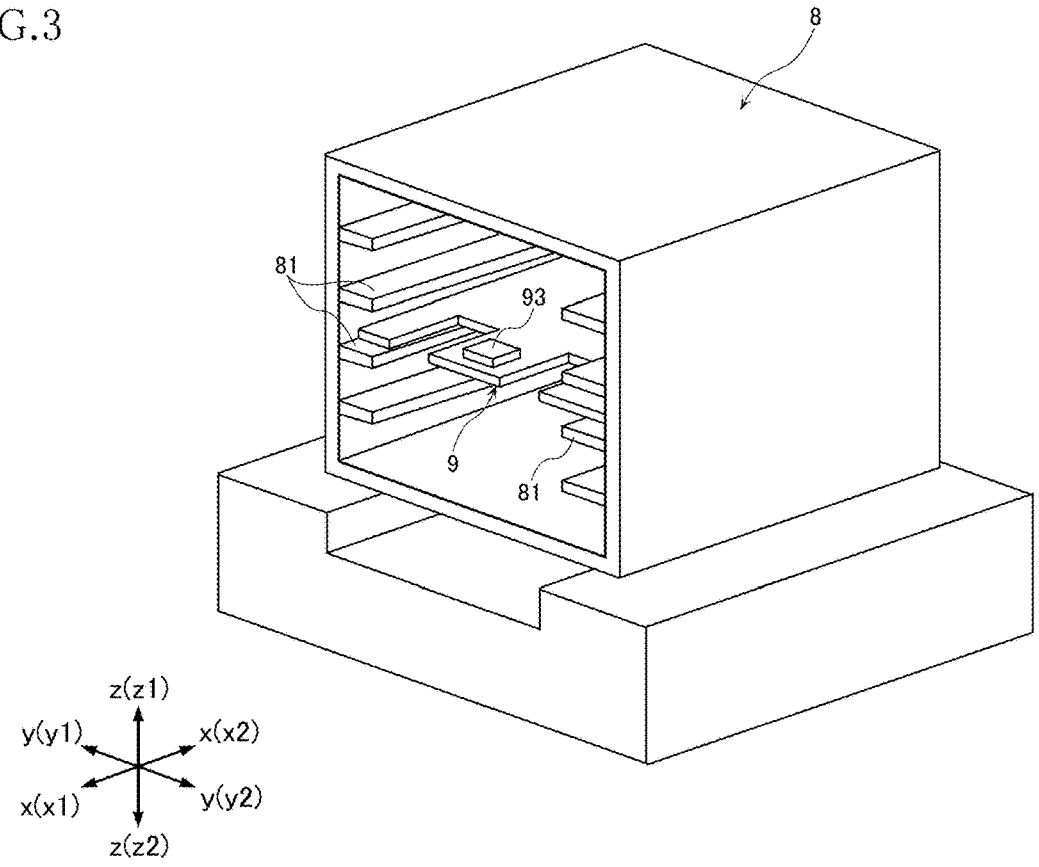
FIG. 3 is a perspective view of an example of a detection target.

According to the present embodiment, teaching work is automatically performed using the object detection sensor 5 attached to the hand section 4 and a jig 9 placed on the upper surfaces of a pair of slots 81 in the cassette 8 As shown in FIGS. 3 and 4. Through the automatic teaching work, the positions of the hand section 4 are instructed and adjusted to move the hand section 4 to a predetermined position.

The jig 9 may be a dummy substrate that is as thin as an actual substrate to be stored in the cassette 8. The material of the jig 9 is not specifically limited. The jig 9 may be made of the same material as an actual substrate or a different material. The jig 9 is placed in a slot 81 of the cassette 8 (see FIG. 3). To ensure that the jig 9 placed in the cassette 8 stays at the same position (the position in the xy plane), the jig 9 of the present embodiment has a rectangular shape that substantially matches the inner surfaces of the cassette 8. That is, the jig 9 has a width (a length in the y direction in FIG. 3) that is slightly narrower than the inside width (an inside length in the y direction). This allows the jig 9 to fit into the cassette 8 and prevents a positional shift of the jig 9 in the width direction (the y direction) in the cassette 8. In addition, the jig 9 placed in a slot 81 such that it abuts against the back of the slot 81. This prevents a positional shift in the depth direction of the cassette 8 (the x direction). This ensures that a detection target 93 (described later) is placed at the specific position on an xy plane. Note that the shape of the jig 9 is not limited to the example described above and may be any shape allowing the positioning of the detection target 93 on the xy plane.

The jig 9 has two notches 91 and 92 in the edge that is located on the open side of the cassette 8 (the x1 side in the x direction in FIG. 3) when the jig 9 is placed in a slot 81 of the cassette 8. The notches 91 and 92 are provided to prevent the holding sections 42 of the hand section 4 from touching the jig 9. Thus, the shape of the notches 91 and 92 are not specifically limited, and other shapes suitable for this purpose may be acceptable. The detection target 93 is disposed on the upper surface of the jig 9 at a location between the notches 91 and 92. In the illustrated example, the detection target 93 has the shape of a rectangular parallelepiped. As shown in FIG. 4, the detection target 93 has six surfaces: one facing the x1 side in the x direction, one facing the x2 side in the x direction, one facing the y1 side in the y direction, one facing the y2 side in the y direction, one facing the z1 side in the z direction, and one facing the z2 side in the z direction.

The detection target 93 has a first edge 931 and a second edge 932. The first edge 931 is located on the y1 side in the y direction and the z1 side in the z direction. In the present embodiment, the first edge 931 is a corner between the side surface facing the y1 side in the y direction and the upper surface facing the z1 side in the z direction. The second edge 932 is located on the y2 side in the y direction and the z1 side in the z direction. In the present embodiment, the second edge 932 is a corner between the side surface facing the y2 side in the y direction and the upper surface facing the z1 side in the z direction. The second edge 932 is spaced apart from the first edge 931 by a predetermined first distance L1. The shape of the detection target 93 is not limited to a rectangular parallelepiped, other shapes having a first edge 931 and a second edge 932 that are detectable may be used.

Next, the following describes the teaching process according to the present embodiment, for automatically performing teaching work.

Figure 6:
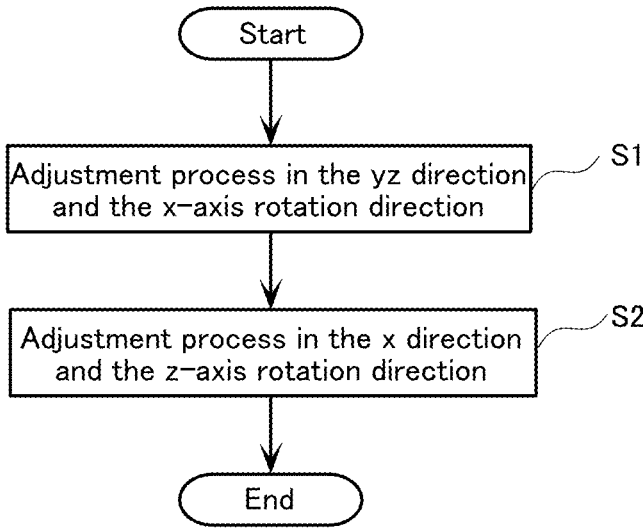
FIG. 6 is a flowchart for illustrating a teaching process.

FIG. 6 is a flowchart for illustrating the teaching process performed by the control device 6. The control device 6 (the control unit 61) starts the teaching process in response to a start instruction entered at the input unit 72 by, for example, an operator. The teaching work involves adjusting the position in the x, y, and z directions and the angle in the direction of rotation around the x axis and around the z axis. The teaching process includes: an adjustment process in the yz direction and the x-axis rotation direction (S1); and an adjustment process in the x direction and the z-axis rotation direction (S2).

<Adjustment Process in yz Direction and x-Axis Rotation Direction: First Example>

Figure 7:
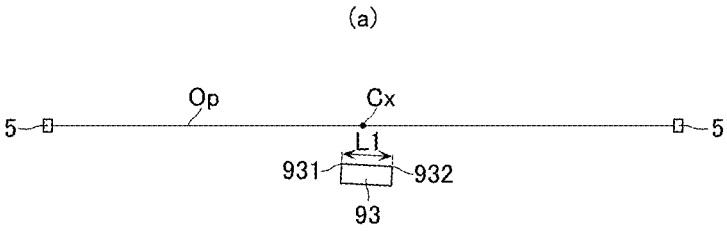
FIG. 7 is a view for illustrating a first example of an adjustment process in the yz direction and the x-axis rotation direction.
Figure 7:
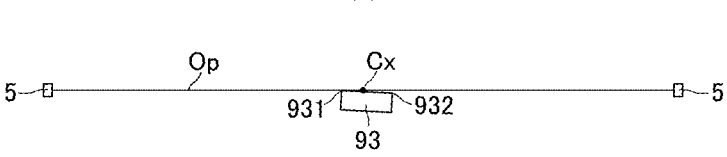
Figure 7:
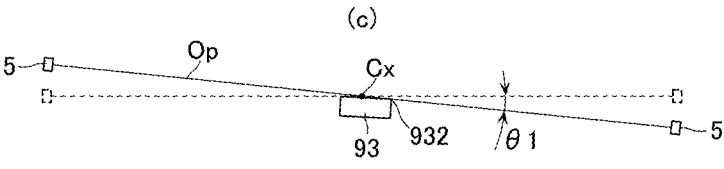
Figure 7:
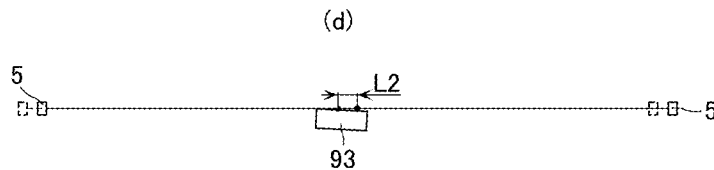
Figure 7:
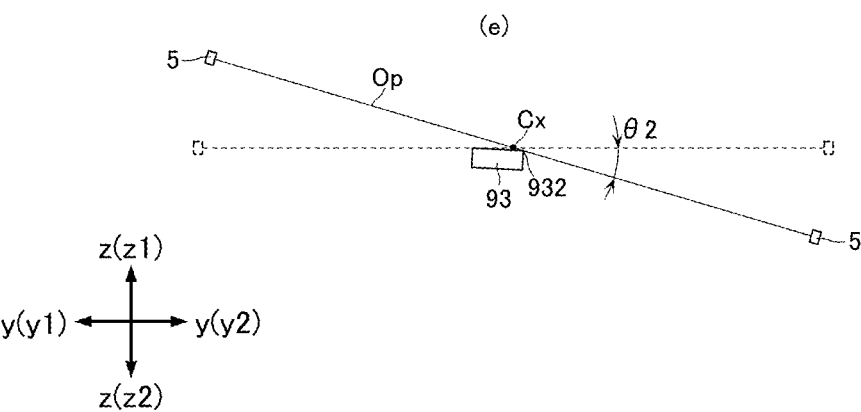

FIG. 7 is a view for illustrating a first example of the adjustment process in the yz direction and the x-axis rotation direction. The figure schematically shows the relative positions of the object detection sensor 5, which is attached to the hand section 4, and the detection target 93 as viewed in

9

Figure 8:
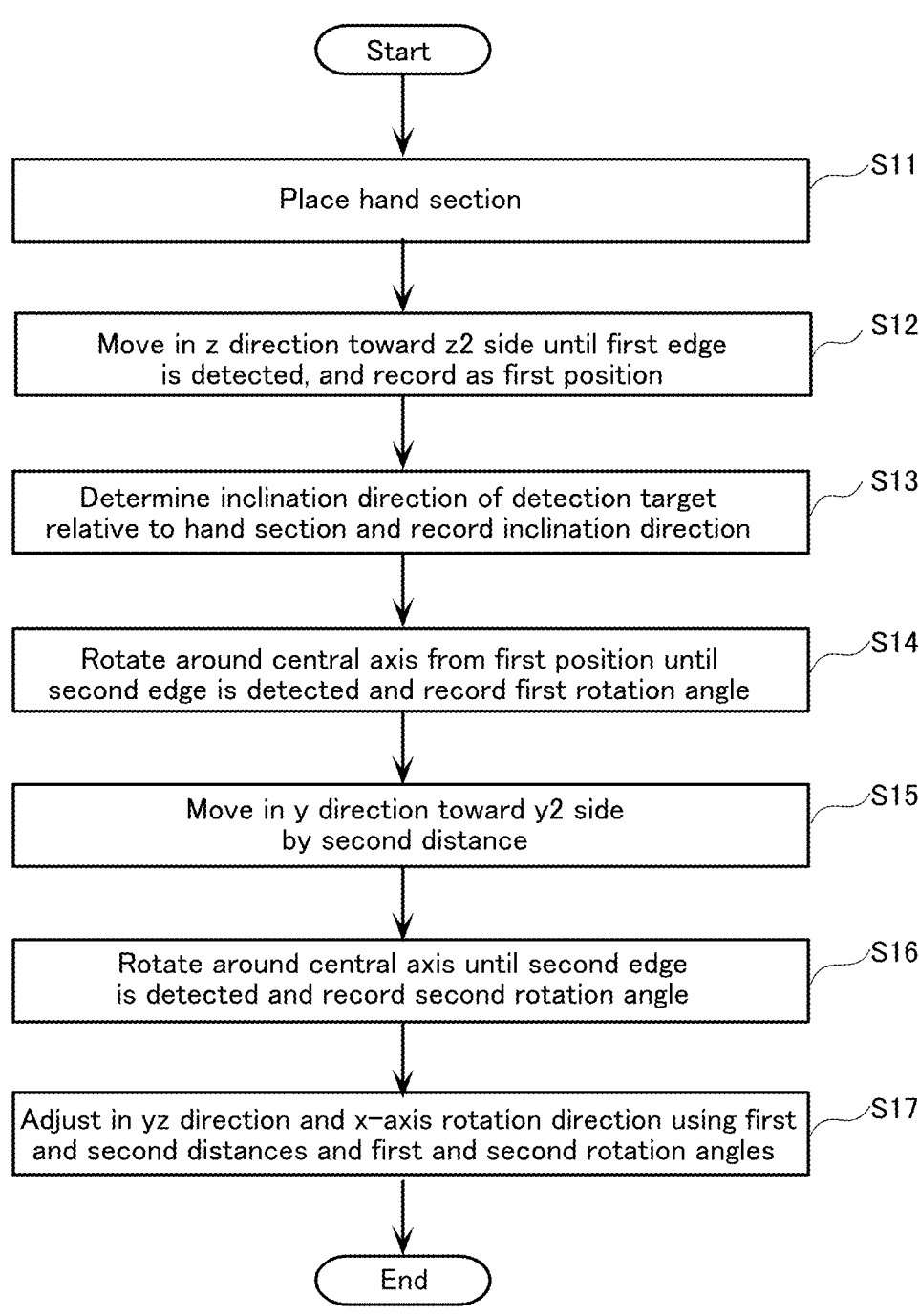
FIG. 8 is a flowchart of the first example of the adjustment process in the yz direction and the x-axis rotation direction.

10 the x direction from the x1 side toward the x2 side. FIG. 8 is a flowchart of an example of the adjustment process in the yz direction and the x-axis rotation direction.

This adjustment process begins with placing the hand section 4 on the z1 side in the z direction from the detection target 93 (see FIG. 7(a), Step S11 in FIG. 8). Next, the hand section 4 is moved in the z direction toward the z2 side while the object detection sensor 5 performs detection. Here, the hand section 4 is moved until the first edge 931 of the detection target 93 is detected (see FIG. 7(b)). The first edge 931 is detected when it comes to block the optical axis Op of the object detection sensor 5, and this position of the hand section 4 is recorded as a first position (Step S12 in FIG. 8).

Subsequently, it is determined whether the detection target 93 is inclined in the clockwise or the counterclockwise sense in the direction of rotation around the x axis relative to the hand section 4 (Step S13 in FIG. 8). In the example shown in FIG. 7, the detection target 93 is inclined clockwise in the direction of rotation around the x axis relative to the hand section 4. This step of determining the inclination direction of the detection target 93 includes rotating the hand section 4 around its central axis Cx while the object detection sensor 5 performs detection. The central axis Cx extends in the x direction and intersects the optical axis Op at the midpoint between the light emitter and the light detector of the object detection sensor 5. The hand section 4 is rotated around the central axis Cx by appropriately driving the vertical arm assembly 1 and the first rotation member 2 with the drive mechanism 71. Specifically, to determine the inclination direction of the detection target 93, the hand section 4 is rotated both clockwise and counterclockwise from the position shown in FIG. 7(b). Consider that the hand section 4 is rotated clockwise from the position shown in FIG. 7(b) (in the direction that reduces the angle between the upper surface of the detection target 93 facing the z1 side in the z direction and the optical axis Op of the object detection sensor 5). As the hand section 4 is rotated clockwise, the optical axis Op comes to be unblocked by the detection target 93 once and then blocked again, this time by the second edge 932 of the detection target 93. Here, the detection of the detection target 93 is defined as being OFF when the optical axis Op of the object detection sensor 5 is unblocked by the detection target 93, and as being ON when the optical axis Op is blocked (the same definition applies to the following description). Then, as the hand section 4 is rotated clockwise from the position shown in FIG. 7(b), the detection of the detection target 93 by the object detection sensor 5 sequentially changes ON→OFF→ON. In contrast, when the hand section 4 is rotated counterclockwise from the position shown in FIG. 7(b), the optical axis Op of the object detection sensor 5 remains blocked by the detection target 93. In other words, when the hand section 4 is rotated counterclockwise from the position shown in FIG. 7(b), the detection of the detection target 93 by the object detection sensor 5 remains ON. Thus, based on the results of detection (ON and OFF) by the object detection sensor 5, it is possible to determine the inclination direction of the detection target 93 relative to the hand section 4 in the direction of rotation around the x-axis. Then, this determination result (the inclination direction of the detection target 93 relative to the hand section 4 in the direction of rotation around the x axis) is recorded in the storage unit 62. The inclination direction of the detection target 93 is used in the process shown in FIG. 7(c) and subsequent processes to determine the direction for rotation around the central axis Cx (clockwise or counterclockwise) and the direction of an angle deviation Δθx around the central axis Cx (clockwise or counterclockwise).

The description of the process shown in FIG. 7(c) and subsequent processes applies to the case where the detection target 93 is inclined clockwise relative to the hand section 4 as shown in FIG. 7. In a case where the detection target 93 is inclined counterclockwise relative to the hand section 4, the left and right sides of FIG. 7 are reversed, and the direction in which the hand section 4 is rotated around the central axis Cx (clockwise and counterclockwise) is also reversed.

Subsequently, the hand section 4 is rotated around the central axis Cx from the first position while the object detection sensor 5 performs detection (see FIG. 7(c)). Here, the hand section 4 is rotated around the central axis Cx until the second edge 932 of the detection target 93 is detected, and the angle through which the hand section 4 is rotated is recorded in the storage unit 62 as a first rotation angle θ1 (Step S14 in FIG. 8). Note that the angles are described in degrees, and the same applies to the following explanations. Subsequently, the hand section 4 is moved from the first position (the position shown in FIG. 7(b)) in the y direction toward the y2 side by a second distance L2 (see FIG. 7(d), Step S15 in FIG. 8). Note that the second distance L2 is determined in advance and may be, but is not limited to, approximately ½ of the first distance L1.

Subsequently, the hand section 4 is rotated around the central axis Cx while the object detection sensor 5 performs detection (see FIG. 7(e)). Here, the hand section 4 is rotated until the second edge 932 of the detection target 93 is detected, and the angle through which the hand section 4 is rotated is recorded in the storage unit 62 as a second rotation angle θ2 (Step S16 in FIG. 8).

Figure 9:
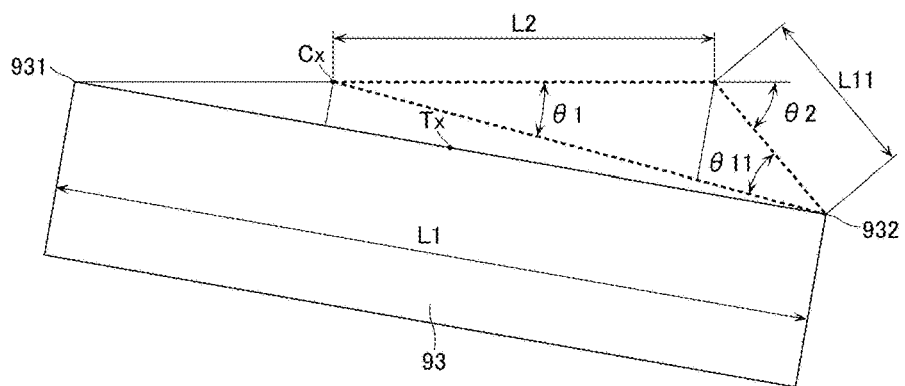
FIG. 9 is a view for illustrating a procedure for calculating an yz-direction deviation and an x-axis rotation angle deviation.
Figure 9:
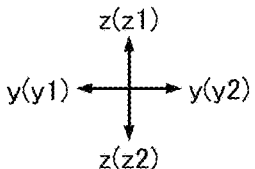
Figure 10:
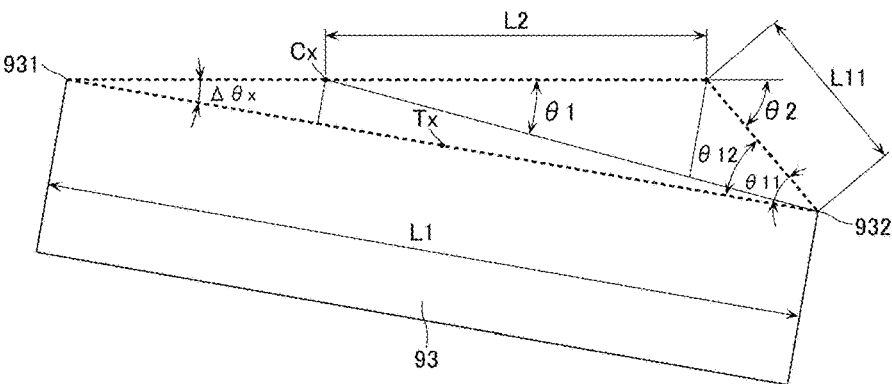
FIG. 10 is a view for illustrating the procedure for calculating an yz-direction deviation and an x-axis rotation angle deviation.
Figure 10:
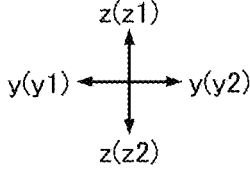
Figure 11:
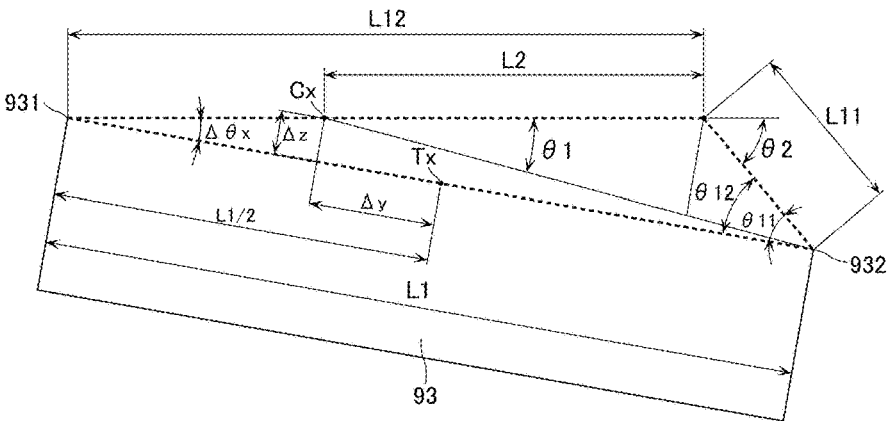
FIG. 11 is a view for illustrating the procedure for calculating an yz-direction deviation and an x-axis rotation angle deviation.
Figure 11:
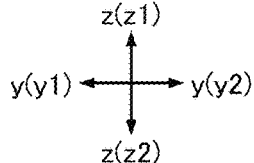

Subsequently, the first distance L1, the second distance L2, the first rotation angle θ1, and the second rotation angle θ2 are used to calculate the yz-direction deviation of the hand section 4 relative to the reference position Tx on the detection target 93 and the x-axis rotation angle deviation of the hand section 4 relative to the detection target 93. FIGS. 9 to 11 are views for illustrating the procedures for calculating the y-direction deviation (Δy), the z-direction deviation (ΔZ), and the x-axis rotation angle deviation (Δθx). The reference position Tx of the detection target 93 is the midpoint between the first edge 931 and the second edge 932 on the upper surface of the detection target 93.

FIG. 9 shows the detection target 93, along with the central axis Cx of the hand section 4, the first distance L1 (the distance from the first edge 931 to the second edge 932), the second distance L2, the first rotation angle θ1, and the second rotation angle θ2, which are shown in FIG. 7. Note that some auxiliary and dimension lines are also shown. With reference to the dashed-line triangle in FIG. 9, the angle θ11 and the distance L11 satisfy the relations given by Equations 1 and 2 below.

$$\theta 11 = 180 - (\theta 1 + (180 - \theta 2)) \qquad \text{[Equation 1]}$$

$$L11 \cdot \sin\theta 11 = L2 \cdot \sin\theta 1 \qquad \text{[Equation 2]}$$

$$L11 = L2 \cdot (\sin\theta 1/\sin\theta 11)$$

With reference to the dashed-line triangle in FIG. 10, the x-axis rotation angle deviation Δθx satisfies the relation shown in Equation 3 below, and the angle θ12 satisfies the relation shown in Equation 4 below.

$$L1/\sin(180 - \theta2) = L11/\sin\Delta\theta x \qquad \text{[Equation 3]}$$

$$\Delta\theta x = \sin^{-1}\left((L11/L1)\cdot\sin(180 - \theta2)\right)$$

$$\theta12 = 180 - (\Delta\theta x + (180 - \theta2)) \qquad \text{[Equation 4]}$$

The angle θ12 and the distance L12 shown in FIG. 11 satisfy the relation shown in Equation 5 below, based on the law of cosines.

$$L1/\sin(180 - \theta2) = L12/\sin\theta12 \qquad \text{[Equation 5]}$$

$$L12 = L1\cdot\left(\sin\theta12/\sin(180 - \theta2)\right)$$

Using the x-axis rotation angle deviation Δθx and the distance L12 that are already calculated, the y-direction deviation Δy and z-direction deviation Δz relative to the reference position Tx of the detection target 93 are given by Equation 6 below.

$$\Delta z = (L12 - L2)\cdot\sin\Delta\theta x \qquad \text{[Equation 6]}$$

$$\Delta y = (1/2)\cdot L1 - (L12 - L2)\cdot\cos\Delta\theta x$$

Once the x-axis rotation angle deviation Δθx, the y-direction deviation Δy, and the z-direction deviation Δz are calculated from the first distance L1, the second distance L2, the first rotation angle θ1, and the second rotation angle θ2 as described above, the angle and position of the hand section 4 are adjusted as follows. That is, the angle of the hand section 4 around the central axis Cx extending in the x direction (the x-axis rotation direction), and the position of the hand section 4 in the y direction (the second direction) and the position of the hand section 4 in the z direction (the third direction) (the position in the yz direction) are adjusted (Step S17 in FIG. 8). This step ends the adjustment process in the yz direction and the x-axis rotation direction shown in the flowchart of FIG. 8.

<Adjustment Process in x Direction and z-Axis Rotation Direction>

Figure 12:
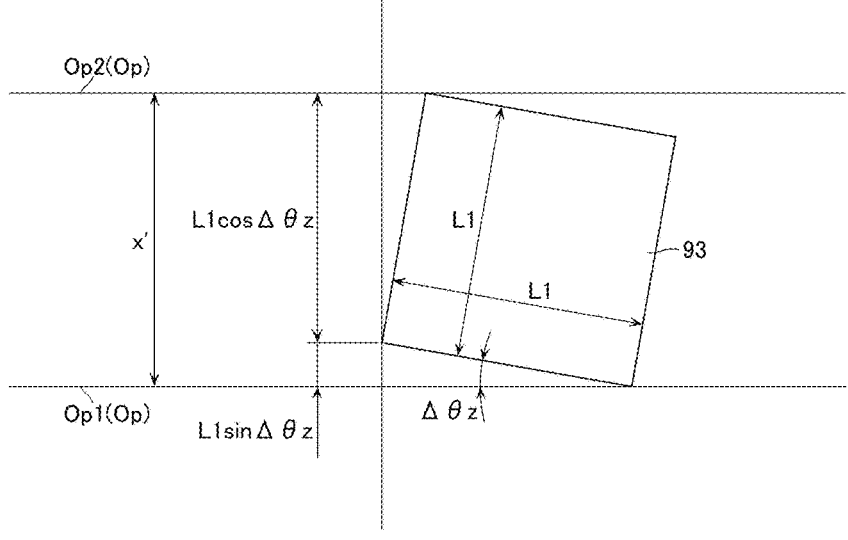
FIG. 12 is a view for illustrating an example of an adjustment process in the x direction and the z-axis rotation direction.
Figure 12:
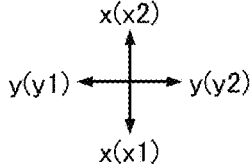

FIG. 12 is a view for illustrating an example of the adjustment process in the x direction and the z-axis rotation direction. The figure schematically shows the relative positions of the optical axis Op of the object detection sensor 5, which is attached to the hand section 4, and the detection target 93 as viewed in the z direction from the z1 side toward the z2 side.

In the adjustment process in the x direction and the z-axis rotation direction, the hand section 4 is moved in the x direction toward the x2 side while the object detection sensor 5 performs detection. In this process, the hand section 4 is positioned at a height (the position in the z direction) that allows the detection target 93 to be detected as the hand section 4 is moved in the x direction. In this example, the hand section 4 is positioned such that the optical axis Op of the object detection sensor 5 falls on the x1 side in the x direction with respect to the detection target 93. The hand section 4 is then moved in the x direction toward the x2 side until the detection target 93 is once detected by the by the object detection sensor 5 and then not detected again. In FIG. 12, the position of the optical axis Op when the detection target 93 enters the detection range is shown as the optical axis Op1, and the position of the optical axis Op when the detection target 93 exits the detection range is shown as the optical axis Op2. The positions of the optical axes Op1 and Op2 in the x direction (the x coordinates) are recorded. The distance x' between the optical axes Op1 and Op2 in the x direction is used to calculate the deviation in the angle of the hand section 4 in the direction of rotation around the z axis (the z-axis rotation angle deviation Δθz) relative to the detection target 93. Note that the detection target 93 is a square as viewed in z direction, with each side equal to the first distance L1. Thus, when there is no angle deviation in the direction of rotation around the z axis, the distance x' is equal to the first distance L1. In contrast, when the z-axis rotation angle deviation Δθz is present as shown in FIG. 12, the distance x' can be expressed using the first distance L1 and the deviation angle θz as x'=L1 sin Δθz+L1 cos Δθz. Then, the value of the z-axis rotation angle deviation Δθz can be calculated as shown in Equation 7 below.

Note that FIG. 12 shows an example in which the detection target 93 is inclined clockwise in the direction of rotation around the z axis. The inclination direction of the detection target 93 in the direction of rotation around the z-axis can be determined in the following procedure, for example. First, the hand section 4 is rotated both clockwise and counterclockwise from the position where the detection target 93 comes to be detected (where the optical axis Op is the optical axis Op1). As the hand section 4 is rotated clockwise around the z axis, the optical axis Op eventually comes to be unblocked by the detection target 93. In other words, the detection of the detection target 93 by the object detection sensor 5 changes to OFF. In contrast, as the hand section 4 is rotated counterclockwise around the z axis, the optical axis Op of the object detection sensor 5 remains blocked by the detection target 93. In other words, the detection of the detection target 93 by the object detection sensor 5 changes to ON. Thus, the results of detection (ON and OFF) by the object detection sensor 5 make it possible to determine the direction in which the detection target 93 is inclined relative to the hand section 4 in the direction of rotation around the z axis. Then, this determination result (the inclination direction of the detection target 93 relative to the hand section 4 in the direction of rotation around the z axis) is recorded in the storage unit 62.

$$x' = L1\cdot\sin\Delta\theta z + L1\cdot\cos\Delta\theta z \qquad \text{[Equation 7]}$$

$$\sin\Delta\theta z + \cos\Delta\theta z = x'/L1$$

$$(\sqrt{2})\cdot\sin(\Delta\theta z + 45) = x'/L1$$

$$\Delta\theta z + 45 = \sin^{-1}\cdot\left(x'/((\sqrt{2})\cdot L1)\right)$$

$$\Delta\theta z + 45 = 1/\sqrt{2}$$

$$\Delta\theta z = \sin^{-1}\cdot\left(x'/((\sqrt{2})\cdot L1)\right) - \sin^{-1}\cdot\left(1/\sqrt{2}\right)$$

As shown above, the z-axis rotation angle deviation Δθz is calculated from the first distance L1 and the distance x' as above. Based on the thus calculated z-axis rotation angle deviation Δθz, the hand section 4 can be adjusted as to the angle in the direction of rotation around the z-axis. For the positional adjustment of the hand section 4 in the x direction, the x coordinate of the center position Cp of the detection target 93 is calculated based on the optical axis Op1 and the distance x' having been recorded. The hand section 4 is then aligned in the x direction relative to the center position Cp. Note that the center position Cp of the detection target 93 is spaced apart from the optical axis Op1 in the x direction toward the x2 side by a distance equal to half the distance x'.

Next, the following describes the operation of the present embodiment.

According to the present embodiment, the teaching work is automatically performed through the teaching process by the control device 6. The teaching process involves only a few and simple manual operations by an operator. Consequently, the time required for the teaching work can be significantly reduced. In addition, the teaching process uses an object detection sensor commonly attached to a transfer robot and does not require an additional component or device installed on the transfer robot.

The transfer robot A1 includes the vertical arm assembly 1, the first rotation member 2, and the horizontal arm assembly 3. The hand section 4 is supported by the horizontal arm assembly 3 and provided with the object detection sensor 5. The object detection sensor 5 detects the detection target 93 while the hand section 4 is moved, and the control device 6 uses the results of detection in teaching the positions of the hand section 4. The detection target 93 has the first edge 931, which is on the y1 side in the y direction and the z1 side in the z direction, and the second edge 932, which is on the y2 side in the y direction and the z1 side in the z direction. The second edge 932 is spaced apart from the first edge 931 by the first distance L1. Based on at least the first distance L1 and the rotation angle through which the hand section 4 is rotated around the central axis Cx that extends in the x direction until at least one of the first edge 931 and the second edge 932 is detected, the control device 6 adjusts the angle of the hand section 4 around the central axis Cx, the position of the hand section 4 in the y direction, and the position of the hand section 4 in the z direction. According to this configuration, the detection target 93 is detected while the hand section 4 is appropriately moved within the yz plane. The results of detection are used to enable efficient adjustment of the position of the hand section 4 in the y-direction and the z-direction within the yz plane and the angle of the hand section 4 in the direction of rotation around the x axis.

The teaching process according to the present embodiment includes the adjustment process in the yz direction and the x-axis rotation direction. In this adjustment process, the control device 6 first moves the hand section 4 in the z direction toward the z2 side until the first edge 931 of the detection target 93 is detected and records the position to which the hand section 4 is moved as a first position. The control device 6 then rotates the hand section 4 around the central axis Cx until the second edge 932 is detected and records the angle through which the hand section 4 is rotated as the first rotation angle θ1. Next, the control device 6 moves the hand section 4 from the first position in the y direction toward y2 side by the second distance L2, rotates the hand section 4 around the central axis Cx until the second edge 932 is detected, and records the angle through which the hand section 4 is rotated as the second rotation angle θ2. Finally, the control device 6 uses the first distance L1, the second distance L2, the first rotation angle θ1, and the second rotation angle θ2 to adjust the angle of the hand section 4 around the central axis Cx, the position of the hand section 4 in the y direction, and the position of the hand section 4 in the z direction. In this way, the detection target 93 is detected while the hand section 4 is appropriately moved within the yz plane. The results of detection are used to enable efficient adjustment of the position of the hand section 4 in the y-direction and the z-direction in the yz plane and the angle of the hand section 4 in the direction of rotation around the x axis. Note that the hand section 4 is moved in the z and y directions within the yx plane and rotated around the central axis Cx through the combined use the vertical arm assembly 1 and the first rotation member 2.

In the present embodiment, the detection target is a rectangular parallelepiped. That is, the detection target 93 is simple in configuration and has the first edge 931 and the second edge 932, which are appropriately detectable in the teaching process (the adjustment process in the yz direction and the x-axis rotation direction).

<Adjustment Process in yz Direction and x-Axis Rotation Direction: Second Example>

Figure 13:
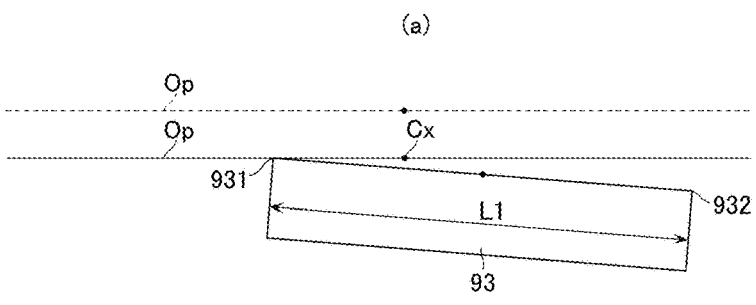
FIG. 13 is a view for illustrating a second example of an adjustment process in the yz direction and the x-axis rotation direction.
Figure 13:
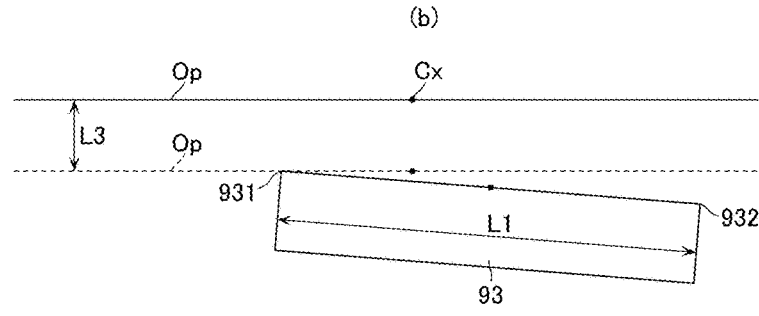
Figure 13:
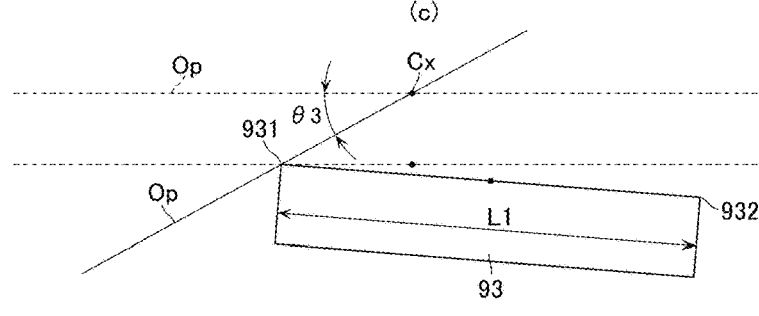
Figure 13:
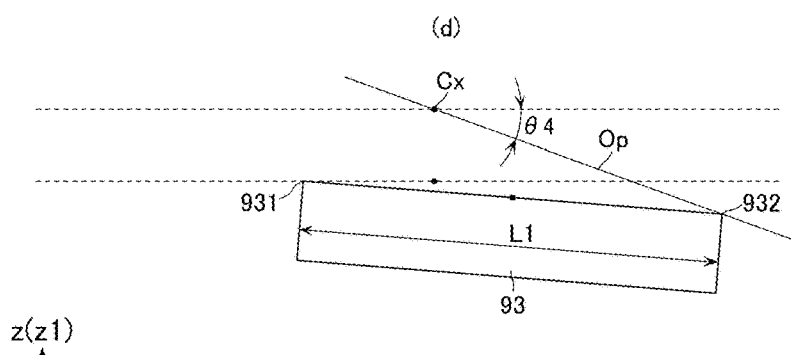
Figure 13:
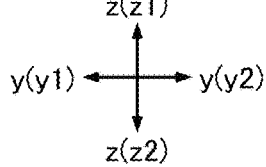
Figure 14:
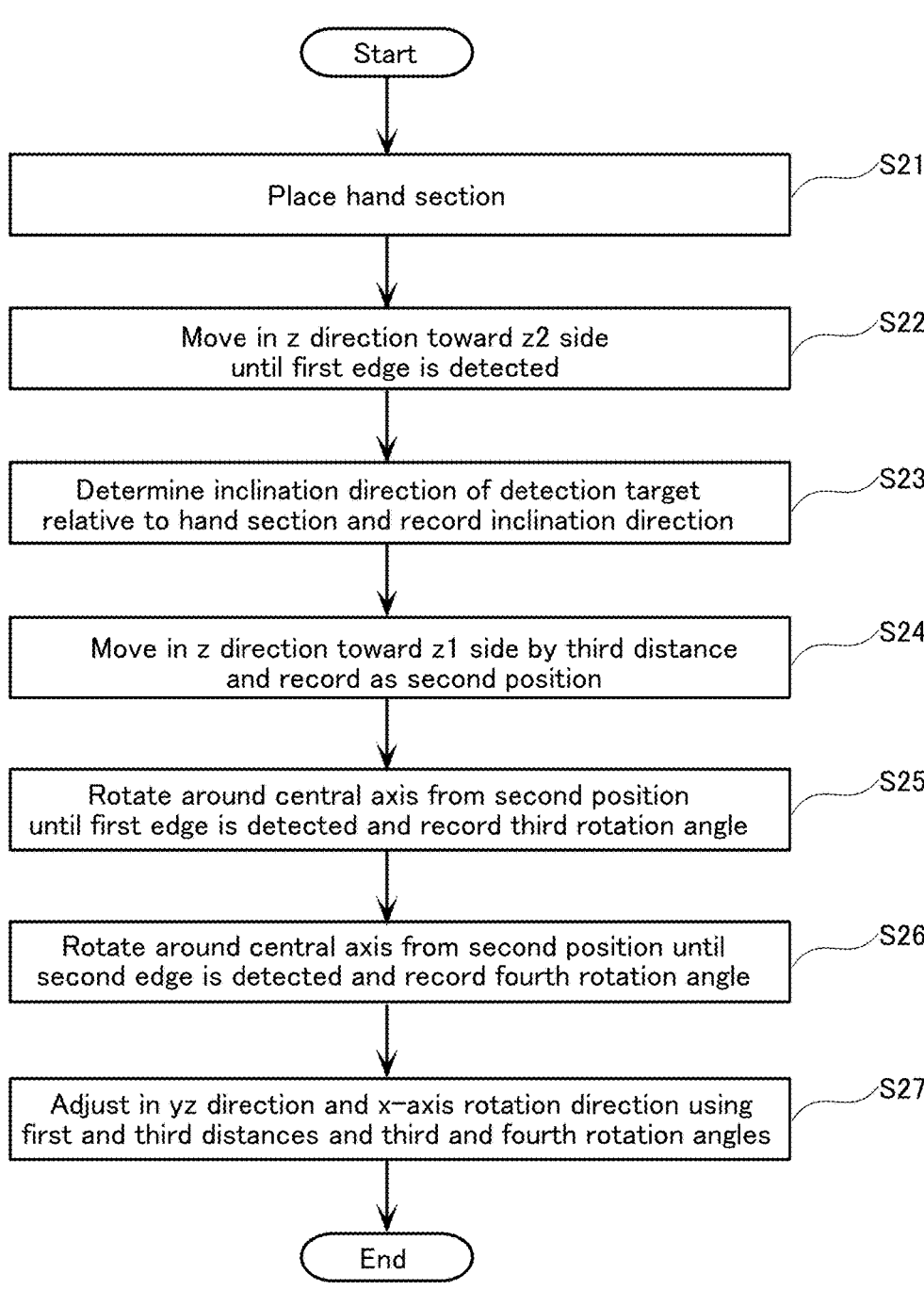
FIG. 14 is a flowchart of the second example of the adjustment process in the yz direction and the x-axis rotation direction.

FIG. 13 is a view for illustrating a second example of the adjustment process in the yz direction and the x-axis rotation direction. The figure schematically shows the relative positions of the optical axis Op of the object detection sensor 5, which is attached to the hand section 4, and the detection target 93 as viewed in the x direction from the x1 side toward the x2 side. FIG. 14 is a flowchart of an example of the adjustment process in the yz direction and the x-axis rotation direction.

The adjustment process of this example begins with placing the hand section 4 on the z1 side in the z direction from the detection target 93 (Step S21 in FIG. 14). Next, the hand section 4 is moved in the z direction toward the z2 side while the object detection sensor 5 performs detection. Here, the hand section 4 is moved until the first edge 931 of the detection target 93 is detected (see FIG. 13(a), Step S22 in FIG. 14). The first edge 931 is detected when it comes to block the optical axis Op of the object detection sensor 5.

Subsequently, it is determined whether the detection target 93 is inclined relative to the hand section 4 in the clockwise sense or the counterclockwise sense in the direction of rotation around the x axis (Step S23 in FIG. 14). In the example shown in FIG. 13, the detection target 93 is inclined clockwise in the direction of rotation around the x axis relative to the hand section 4. This step of determining the inclination direction of the detection target 93 includes rotating the hand section 4 around the central axis Cx while the object detection sensor 5 performs detection. Specifically, to determine the inclination direction of the detection target 93, the hand section 4 is rotated both clockwise and counterclockwise from the position shown in FIG. 13(a). Consider that the hand section 4 is rotated clockwise from the position shown in FIG. 13(a) (in the direction that reduces the angle between the upper surface of the detection target 93 facing the z1 side in the z direction and the optical axis Op of the object detection sensor 5). As the hand section 4 is rotated clockwise, the optical axis Op comes to be unblocked by the detection target 93 once and then blocked again, this time by the second edge 932 of the detection target 93. In other words, as the hand section 4 is rotated clockwise from the position shown in FIG. 13(a), the detection of the detection target 93 by the object detection sensor 5 sequentially changes ON→OFF→ON. In contrast, when the hand section 4 is rotated counterclockwise from the position shown in FIG. 13(a), the optical axis Op of the object detection sensor 5 remains blocked by the detection target 93. In other words, when the hand section 4 is rotated counterclockwise from the position shown in FIG. 13(a), the detection of the detection target 93 by the object detection sensor 5 remains ON. Thus, the results of detection (ON and OFF) by the object detection sensor 5 make it possible to determine the direction in which the detection target 93 is inclined relative to the hand section 4 in the direction of rotation around the x axis. Then, this determination result (the inclination direction of the detection target 93 relative to the hand section 4 around the x axis) is recorded in the storage unit 62. The inclination direction of the detection target 93 is used in the process shown in FIG. 13(*b*) and subsequent processes (described later) to determine the direction for rotation around the central axis Cx (clockwise or counterclockwise) and the direction of an angle deviation Δθx around the central axis Cx (clockwise or counterclockwise). Note that the description of the process shown in FIG. 13(*b*) and subsequent processes applies to the case where the detection target 93 is inclined clockwise relative to the hand section 4 as shown in FIG. 13. In a case where the detection target 93 is inclined counterclockwise relative to the hand section 4, the left and right sides of FIG. 13 are reversed, and the direction in which the hand section 4 is rotated around the central axis Cx (clockwise and counterclockwise) is also reversed.

Subsequently, the hand section 4 is moved in the z direction toward the z1 side by a third distance L3 (see FIG. 13(*b*)). Note that the third distance L3 is determined in advance. This position of the hand section 4 is recorded as a second position (Step S24 in FIG. 14). Subsequently, the hand section 4 is rotated around the central axis Cx from the second position while the object detection sensor 5 performs detection (see FIG. 13(*c*)). Here, the hand section 4 is rotated until the first edge 931 of the detection target 93 is detected, and the angle through which the hand section 4 is rotated is recorded in the storage unit 62 as a third rotation angle θ3 (Step S25 in FIG. 14).

Subsequently, the hand section 4 is rotated around the central axis Cx from the second position while the object detection sensor 5 performs detection (see FIG. 13(*d*)). Here, the hand section 4 is rotated until the second edge 932 of the detection target 93 is detected, and the angle through which the hand section 4 is rotated is recorded in the storage unit 62 as a fourth rotation angle θ4 (Step S26 in FIG. 14).

Figure 15:
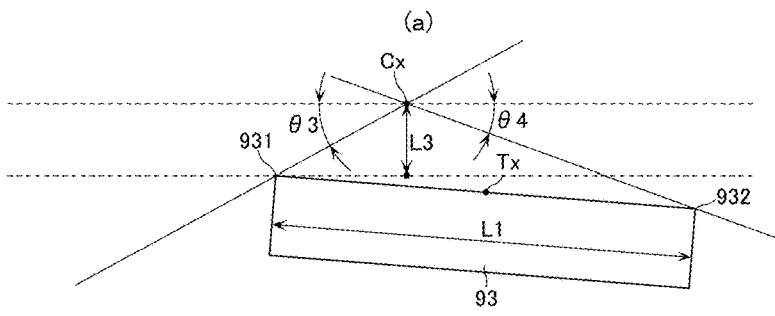
FIG. 15 is a view for illustrating a procedure for calculating an yz-direction deviation and an x-axis rotation angle deviation.
Figure 15:
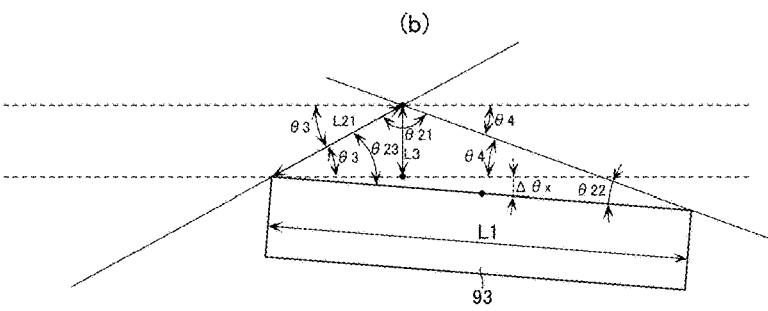
Figure 15:
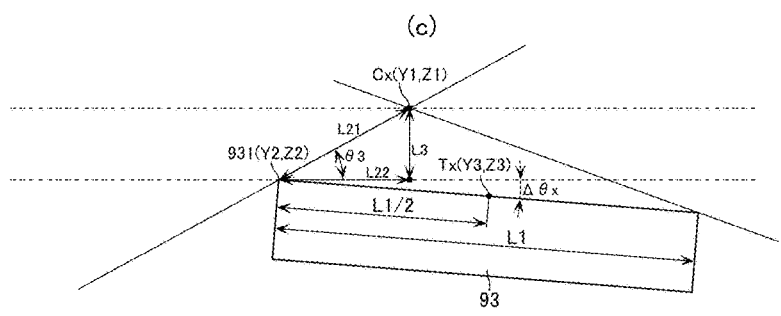
Figure 15:
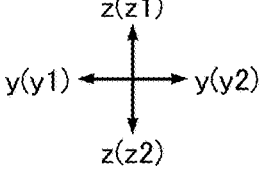

Subsequently, the first distance L1, the third distance L3, the third rotation angle θ3, and the fourth rotation angle θ4 are used to calculate the yz-direction deviation of the hand section 4 relative to the reference position Tx on the detection target 93 and the x-axis rotation angle deviation of the hand section 4 relative to the detection target 93. FIG. 15 is a view for illustrating the procedures for calculating the y-direction deviation (Δy), the z-direction deviation (ΔZ), and the x-axis rotation angle deviation (Δθx). The reference position Tx of the detection target 93 is the midpoint between the first edge 931 and the second edge 932 on the upper surface of the detection target 93.

FIG. 15(*a*) shows the detection target 93, along with the central axis Cx of the hand section 4, the first distance L1 (the distance from the first edge 931 to the second edge 932), the third distance L3, the third rotation angle θ3, and the fourth rotation angle θ4, which are shown in FIG. 13. Note that some auxiliary and dimension lines are also shown.

The distance L21, the third distance L3, and the third rotation angle θ3, which are shown in FIG. 15(*b*), satisfy the relation shown in Equation 8 below. Similarly, the third rotation angle θ3, the fourth rotation angle θ4 and the angle θ21 satisfy the relation shown in Equation 9 below.

16

$$L3 = L21 \cdot \sin\theta3 \qquad \text{[Equation 8]}$$

$$L21 = L3/\sin\theta3$$

$$\theta21 = 180 - \theta3 - \theta4 \qquad \text{[Equation 9]}$$

The angle θ21, the distance L21, the angle θ22, and the first distance L1, which are shown in FIG. 15(*b*), satisfy the relation shown in Equation 10 below, based on the law of sines.

$$L1/\sin\theta21 = L21/\sin\theta22 \qquad \text{[Equation 10]}$$

$$\theta22 = \sin^{-1} \cdot \left((L21/L1) \cdot \sin\theta21\right)$$

The angle θ23 is expressed using the angles θ21 and θ22 as in Equation 11 below. From the angle θ23 and the third rotation angle θ3, the x-axis rotation angle deviation Δθx satisfies the relation shown in Equation 11 below.

$$\theta23 = 180 - \theta21 - \theta22 \qquad \text{[Equation 11]}$$

$$\Delta\theta x = \theta23 - \theta3$$

From Equations 9 to 11, the x-axis rotation angle deviation Δθx is expressed as shown in Equation 12 below.

$$\Delta\theta x = 180 - \theta21 - \theta22 - \theta3 \qquad \text{[Equation 12]}$$

$$= 180 - (180 - \theta3 - \theta4) - \sin^{-1} \cdot \left((L3 \cdot \sin\theta21)/(L1 \cdot \sin\theta3)\right) - \theta3$$

$$= \theta4 - \sin^{-1} \cdot \left((L3 \cdot \sin(180 - \theta3 - \theta4))/(L1 \cdot \sin\theta3)\right)$$

From the distance L21 and the third rotation angle θ3, the distance L22, which is shown in FIG. 15(*c*), is expressed as shown in Equation 13 below.

$$L22 = L21 \cdot \cos\theta3 \qquad \text{[Equation 13]}$$

With reference to FIG. 15(*c*), suppose that the position coordinates (y and z coordinates) of the central axis Cx are (Y1, Z1), and the position coordinates of the first edge 931 are (Y2, Z2), and the position coordinates of the reference position Tx are (Y3, Z3). In this example, the y-direction deviation Δy and the z-direction deviation Δz of the hand section 4 relative to the reference position Tx of the detection target 93 are determined by calculating the difference in the y and z coordinates between the central axis Cx of the hand section 4 and the reference position Tx of the detection target 93. In other words, the respective deviations are calculated as follows: the y-direction deviation Δy=Y3−Y1, and the z-direction deviation Δz=Z3−Z1.

Here, the position coordinates (Y1, Z1) of the central axis Cx and the position coordinates (Y2, Z2) of the first edge 931 satisfy the relation shown in Equation 14. The position coordinates (Y2, Z2) of the first edge 931 and the position coordinates (Y3, Z3) of the reference position Tx satisfy the relation shown in Equation 15.

$$Y2 = Y1 - L22 \qquad \text{[Equation 14]}$$

$$Z2 = Z1 - L3$$

$$Y3 = Y2 + (L1/2) \cdot \cos\Delta\theta x \qquad \text{[Equation 15]}$$

$$Z3 = Z2 + (L1/2) \cdot \sin\Delta\theta x$$

From the Equations 14, 15, and 13, the y-direction deviation $\Delta y$ is calculated as shown in Equation 16 below.

$$\Delta y = Y1 - Y3 \qquad \text{[Equation 16]}$$

$$= Y2 + L22 - Y3$$

$$= Y2 + L22 - (Y2 + (L1/2) \cdot \cos\Delta\theta x)$$

$$= L21 \cdot \cos\Delta\theta 3 - (L1/2) \cdot \cos\Delta\theta x$$

$$= L3 \cdot (\cos\theta 3/\sin\theta 3) - (L1/2) \cdot \cos\Delta\theta x$$

From the Equations 14 and 15, the z-direction deviation $\Delta z$ is calculated as shown in Equation 17 below.

$$\Delta z = Z1 - Z3 \qquad \text{[Equation 17]}$$

$$= Z2 + L3 - Z3$$

$$= Z2 + L3 - (Z2 - (L1/2) \cdot \sin\Delta\theta x)$$

$$= L3 + (L1/2) \cdot \sin\Delta\theta x$$

Once the x-axis rotation angle deviation $\Delta\theta x$, the y-direction deviation $\Delta y$, and the z-direction deviation $\Delta z$ are calculated from the first distance L1, the third distance L3, the third rotation angle $\theta 3$, and the fourth rotation angle $\theta 4$ as described above, the angle and position of the hand section 4 are adjusted as follows. That is, the angle of the hand section 4 around the central axis Cx extending in the x direction (the x-axis rotation direction), and the position of the hand section 4 in the y direction (the second direction) and the position of the hand section 4 in the z direction (the third direction) (the position in the yz direction) are adjusted (Step S27 in FIG. 14). This step ends the adjustment process in the yz direction and the x-axis rotation direction shown in the flowchart of FIG. 14.

The teaching process of this example includes the adjustment process in the yz direction and the x-axis rotation direction. In this process, the control device 6 first moves the hand section 4 in the z direction toward the z2 side until the first edge 931 of the detection target 93 is detected and then in the z direction toward the z1 side by the third distance L3. The control device 6 records this position of the hand section 4 as a second position. Subsequently, the control device 6 rotates the hand section 4 around the central axis Cx until the first edge 931 is detected and records the angle through which the hand section 4 is rotated as the third rotation angle $\theta 3$. Subsequently, the control device 6 rotates the hand section 4 around the central axis Cx from the second position until the second edge 932 is detected and records the angle through which the hand section 4 is rotated as the fourth rotation angle $\theta 4$. Finally, the control device 6 uses the first distance L1, the third distance L3, the third rotation angle $\theta 3$, and the fourth rotation angle $\theta 4$ to adjust the angle of the hand section 4 around the central axis Cx, the position of the hand section 4 in the y direction, and the position of the hand section 4 in the z direction. In this way, the detection target 93 is detected while the hand section 4 is appropriately moved within the yz plane. The results of detection are used to enable efficient adjustment of the position of the hand section 4 in the y-direction and the z-direction in the yz plane and the angle of the hand section 4 in the direction of rotation around the x axis.

The transfer robot teaching system and the transfer robot teaching method according to the present disclosure are not limited to the embodiments described above. Various modifications in design may be made freely in the specific configuration of the system and method of teaching a transfer robot according to the present disclosure. In the embodiments described above, the teaching work is performed using the detection target 93 attached to the cassette 8. The present disclosure, however, is not limited to such an embodiment. For example, the teaching work may be performed using a detection target 93 attached to a load lock chamber.

REFERENCE NUMERALS

A1: transfer robot
1: vertical arm assembly
2: first rotation member
3: horizontal arm assembly
4, 4A and 4B: hand section
5: object detection sensor
6: control device
93: detection target
931: first edge
932: second edge
Ox: first rotation axis
Cx: central axis
L1: first distance
L2: second distance
L3: third distance
$\theta 1$: first rotation angle
$\theta 2$: second rotation angle
$\theta 3$: third rotation angle
$\theta 4$: fourth rotation angle

The invention claimed is:
1. A teaching system for a transfer robot provided with:
a vertical arm assembly that is of a vertical articulated type and moves in an in-plane direction orthogonal to a horizontal first direction;
a first rotation member supported by the vertical arm assembly and rotatable around a first rotation axis that extends in the first direction;
a horizontal arm assembly that is of a horizontal articulated type and is supported by the first rotation member;
a hand section supported by the horizontal arm assembly and provided with an object detection sensor; and
a control device that detects a detection target with the object detection sensor while moving the hand section and teaches a position of the hand section using a result of the detection,
wherein the detection target includes a first edge and a second edge that is spaced apart from the first edge by a first distance, the first edge being located on a first side in a horizontal second direction orthogonal to the first direction and on a first side in a third direction orthogonal to the first direction and the second direction, the second edge being located on a second side in the second direction and on the first side in the third direction, and wherein the teaching system comprises causing the control device to adjust an angle of the hand section around a central axis that extends in the first direction, a position of the hand section in the second direction, and a position of the hand section in the third direction, the adjustment being based on at least the first distance and a rotation angle through which the hand section is rotated around the central axis until at least one of the first edge and the second edge is detected.

2. The teaching system according to claim 1, wherein the control device is configured to:

move the hand section toward a second side in the third direction until the first edge is detected and record a position to which the hand section is moved as a first position;

rotate the hand section around the central axis from the first position until the second edge is detected and record a first rotation angle through which the hand section is rotated;

move the hand section from the first position toward the second side in the second direction by a second distance;

rotate the hand section around the central axis until the second edge is detected and record a second rotation angle through which the hand section is rotated; and adjust the angle of the hand section around the central axis, the position of the hand section in the second direction, and the position of the hand section in the third direction, using the first distance, the second distance, the first rotation angle, and the second rotation angle.

3. The teaching system according to claim 1, wherein the control device is configured to:

move the hand section toward the second side in the third direction until the first edge is detected;

move the hand section toward the first side in the third direction by a third distance and record a position to which the hand section is moved as a second position;

rotate the hand section around the central axis from the second position until the first edge is detected and record a third rotation angle through which the hand section is rotated;

rotated the hand section around the central axis from the second position until the second edge is detected and record a fourth rotation angle through which the hand section is rotated; and adjust the angle of the hand section around the central axis, the position of the hand section in the second direction, and the position of the hand section in the third direction, using the first distance, the third distance, the third rotation angle, and the fourth rotation angle.

4. The teaching system according to claim 1, wherein the detection target has a shape of a rectangular parallelepiped.

5. A teaching method for a transfer robot provided with:

a vertical arm assembly that is of a vertical articulated type and moves in an in-plane direction orthogonal to a horizontal first direction;

a first rotation member supported by the vertical arm assembly and rotatable around a first rotation axis that extends in the first direction;

a horizontal arm assembly that is of a horizontal articulated type and is supported by the first rotation member; and a hand section supported by the horizontal arm assembly and provided with an object detection sensor, wherein the teaching method is configured to detect a detection target with the object detection sensor while moving the hand section and teach a position of the hand section using a result of the detection, wherein the detection target includes a first edge and a second edge that is spaced apart from the first edge by a first distance, the first edge being located on a first side in a horizontal second direction orthogonal to the first direction and a first side in a third direction orthogonal to the first direction and the second direction, the second edge being located on a second side in the second direction and the first side in the third direction, the teaching method comprising:

moving the hand section toward a second side in the third direction until the first edge is detected and recording a position to which the hand section is moved as a first position;

rotating the hand section around a central axis that extends in the first direction, from the first position until the second edge is detected and recording a first rotation angle through which the hand section is rotated;

moving the hand section from the first position toward the second side in the second direction by a second distance;

rotating the hand section around the central axis until the second edge is detected and recording a second rotation angle through which the hand section is rotated; and adjusting an angle of the hand section around the central axis, a position of the hand section in the second direction, and a position of the hand section in the third direction, using the first distance, the second distance, the first rotation angle, and the second rotation angle.

6. A teaching method for a transfer robot provided with:

a vertical arm assembly that is of a vertical articulated type and moves in an in-plane direction orthogonal to a horizontal first direction;

a first rotation member supported by the vertical arm assembly and rotatable around a first rotation axis that extends in the first direction;

a horizontal arm assembly that is of a horizontal articulated type and is supported by the first rotation member; and a hand section supported by the horizontal arm assembly and provided with an object detection sensor, wherein the teaching method is configured to detect a detection target with the object detection sensor while moving the hand section and teach a position of the hand section using a result of the detection, wherein the detection target includes a first edge and a second edge that is spaced apart from the first edge by a first distance, the first edge being located on a first side in a horizontal second direction orthogonal to the first direction and a first side in a third direction orthogonal to the first direction and the second direction, the second edge being located on a second side in the second direction and the first side in the third direction, the teaching method comprising:

moving the hand section toward a second side in the third direction until the first edge is detected;

moving the hand section toward the first side in the third direction by a third distance and recording a position to which the hand section is moved as a second position;

rotating the hand section around a central axis that extends in the first direction, from the second position until the first edge is detected and recording a third rotation angle through which the hand section is rotated;

rotating the hand section around the central axis from the second position until the second edge is detected and recording a fourth rotation angle through which the hand section is rotated; and adjusting an angle of the hand section around the central axis, a position of the hand section in the second direction, and a position of the hand section in the third direction, using the first distance, the third distance, the third rotation angle, and the fourth rotation angle.

* * * * *